United States Patent
Barhate et al.

(10) Patent No.: US 12,288,087 B2
(45) Date of Patent: Apr. 29, 2025

(54) USER GUIDANCE FROM GAZE INFORMATION DURING A COMMUNICATION SESSION WHILE VIEWING A WEBPAGE

(71) Applicant: Avaya Management L.P., Durham, NC (US)

(72) Inventors: Kiran Barhate, Pune (IN); Harsimran Jeet Singh, Pune (IN); Jibin George, Pune (IN); Sandeep Goynar, Pune (IN)

(73) Assignee: Avaya Management L.P., Morristown, NJ (US)

( * ) Notice: Subject to any disclaimer, the term of this patent is extended or adjusted under 35 U.S.C. 154(b) by 0 days.

(21) Appl. No.: 17/884,310

(22) Filed: Aug. 9, 2022

(65) Prior Publication Data

US 2022/0382571 A1 Dec. 1, 2022

Related U.S. Application Data

(63) Continuation of application No. 17/314,288, filed on May 7, 2021, now Pat. No. 11,422,836.

(51) Int. Cl.
| | |
|---|---|
| *G06F 9/451* | (2018.01) |
| *G06F 3/01* | (2006.01) |
| *G06F 11/32* | (2006.01) |
| *G06F 11/34* | (2006.01) |
| *G06N 20/00* | (2019.01) |
| *H04L 67/141* | (2022.01) |

(52) U.S. Cl.
CPC ............. *G06F 9/453* (2018.02); *G06F 3/013* (2013.01); *G06F 3/017* (2013.01); *G06F 11/327* (2013.01); *G06F 11/3438* (2013.01); *G06N 20/00* (2019.01); *H04L 67/141* (2013.01)

(58) Field of Classification Search
CPC ...... G06F 9/453; G06F 3/017; G06F 11/3438; G06F 11/327; G06N 20/00
See application file for complete search history.

(56) References Cited

U.S. PATENT DOCUMENTS

| | | | | |
|---|---|---|---|---|
| 2010/0054526 | A1* | 3/2010 | Eckles | H04N 7/147 382/100 |
| 2012/0256967 | A1* | 10/2012 | Baldwin | G09G 5/34 345/684 |
| 2017/0308292 | A1* | 10/2017 | Choi | G06F 16/248 |
| 2020/0110572 | A1* | 4/2020 | Lenke | G06F 3/167 |

* cited by examiner

*Primary Examiner* — Andrey Belousov

(57) ABSTRACT

The technology disclosed herein enables user guidance from gaze information obtained while viewing a webpage. In a particular embodiment, a method includes, during a communication session between a first endpoint operated by a first user and a second endpoint operated by a second user, receiving gaze information indicating a location where the second user is looking relative to a webpage being presented to the second user at the second endpoint. The method further includes determining that the second user has been looking at the location for longer than a threshold amount of time. In response to determining that the second user has been looking at the location for longer than the threshold amount of time, the method includes notifying the first user about the location. Notifying the first user includes a suggestion of a resolution from a previous communication session that achieved positive results.

20 Claims, 8 Drawing Sheets

USER GUIDANCE FROM GAZE INFORMATION DURING A COMMUNICATION SESSION WHILE VIEWING A WEBPAGE

RELATED APPLICATIONS

This application is a continuation of, and claims priority to, U.S. patent application Ser. No. 17/314,288, entitled "USER GUIDANCE FROM GAZE INFORMATION DURING A COMMUNICATION SESSION WHILE VIEWING A WEBPAGE," filed May 7, 2021, which is hereby incorporated by reference in its entirety.

TECHNICAL BACKGROUND

Gaze tracking allows a computing system to determine where on a display screen (or where in a specific area, e.g., application window, on the display screen) a user is looking. Currently, in a contact center environment, gaze tracking is mainly limited to finding a caller's (e.g., customer) interest/focus area on the screen when speaking with an agent of the contact center. The contact center will typically train that agent to handle communications with callers. There are various techniques used for agent learning/training purposes like recording the customer interaction, sentiment, context etc. Also, documentation for the training and frequently asked questions (FAQs) behind products and services supported by the contact center may also need to be revamped over time based on changes and information from callers. Although, callers do not always provide the post call feedback, which limits the input data for constructing data model that can be used for improvising agent learning/training and for better caller experience.

SUMMARY

The technology disclosed herein enables user guidance from gaze information obtained while viewing a webpage. In a particular embodiment, a method includes, during a communication session between a first endpoint operated by a first user and a second endpoint operated by a second user, receiving gaze information indicating a location where the second user is looking relative to a webpage being presented to the second user at the second endpoint. The method further includes determining that the second user has been looking at the location for longer than a threshold amount of time. In response to determining that the second user has been looking at the location for longer than the threshold amount of time, the method includes notifying the first user about the location. Notifying the first user includes a suggestion of a resolution from a previous communication session that achieved positive results.

In some examples, the method includes presenting the webpage to the first user at the first endpoint. The communication session comprises a co-browsing session through which the webpage is presented at the first endpoint and the second endpoint. In those examples, notifying the first user may include presenting, on the webpage at the first endpoint with the suggestion, an indication of the location and an alert informing the first user that the second user has been looking at the location for longer than the threshold amount of time.

In some examples, notifying the first user comprises presenting, with the suggestion, an alert informing the first user that the second user has been looking at the location for longer than the threshold amount of time.

In some examples, the suggestion directs the first user to guide the second user to a second location on the webpage that is related to a present context of the communication session.

In some examples, the suggestion directs the first user to address a location context associated with the location.

In some examples, determining that the second user has been looking at the location for longer than the threshold amount of time includes feeding the gaze information and a present context of user communications over the communication session into an artificial intelligence algorithm. The artificial intelligence algorithm outputs instructions for notifying the first user about the second location. In those examples, the method may include training the artificial intelligence algorithm using prior gaze information, prior present contexts of user communications, and prior resolutions on previous communication sessions.

In another embodiment, a method includes receiving gaze information over a communication network from an endpoint indicating a location where a user of the endpoint is looking relative to a webpage being presented to the user at the endpoint. The method further includes determining that the user has been looking at the location for longer than a threshold amount of time. In response to determining that the user has been looking at the location for longer than the threshold amount of time, the method includes notifying the user about the location. Notifying the user includes an alert providing a navigation suggestion.

In some examples, the receiving, the determining, and the notifying occur during a communication session between the endpoint and a second endpoint.

In some examples, the navigation suggestion helps the user navigate offerings on the webpage.

In some examples, the navigation suggestion clarifies one or more issues of the user prior to establishing a communication session between the endpoint and a second endpoint.

In some examples, determining that the user has been looking at the location for longer than the threshold amount of time includes feeding the gaze information into an artificial intelligence algorithm. The artificial intelligence algorithm outputs the navigation suggestion.

In yet another embodiment, an apparatus is provided having one or more computer readable storage media and a processing system operatively coupled with the one or more computer readable storage media. Program instructions stored on the one or more computer readable storage media, when read and executed by the processing system, direct the apparatus to, during a communication session between a first endpoint operated by a first user and a second endpoint operated by a second user, receive gaze information indicating a location where the second user is looking relative to a webpage being presented to the second user at the second endpoint. The program instructions further direct the apparatus to determine that the second user has been looking at the location for longer than a threshold amount of time. In response to determining that the second user has been looking at the location for longer than the threshold amount of time, the program instructions direct the apparatus to notify the first user about the location. Notification of the first user includes a suggestion of a resolution from a previous communication session that achieved positive results.

DETAILED DESCRIPTION

The examples provided herein enable tracking of a user's gaze relative to a webpage being viewed by the user while a communication session with another user (e.g., contact center agent) to discuss the webpage or the content thereon. The web-assist systems notify the other user when the user's gaze is focused on a particular location of the webpage for longer than a threshold amount of time. If the other user is an agent of a contact center, then the agent may be able to address, on the communication session, that the user has been looking at the same place for a relatively long amount of time (i.e., longer than the threshold). For instance, the user may be confused because what they are looking at on the webpage (i.e., the location) does not correspond to the current context (e.g., topic) of the conversation with the agent over the communication session. In some examples, the location and context of the conversation (and, possibly, how the agent handles being notified of the location) may be used to train a machine learning algorithm to generate a model for use when training agents in the future. The training may, therefore, enable the agents to anticipate and handle issues like that experienced during the above communication session. Similarly, FAQs for the webpage may be updated in an attempt to help potential callers prior to initiation of a call to the contact center.

Figure 1:
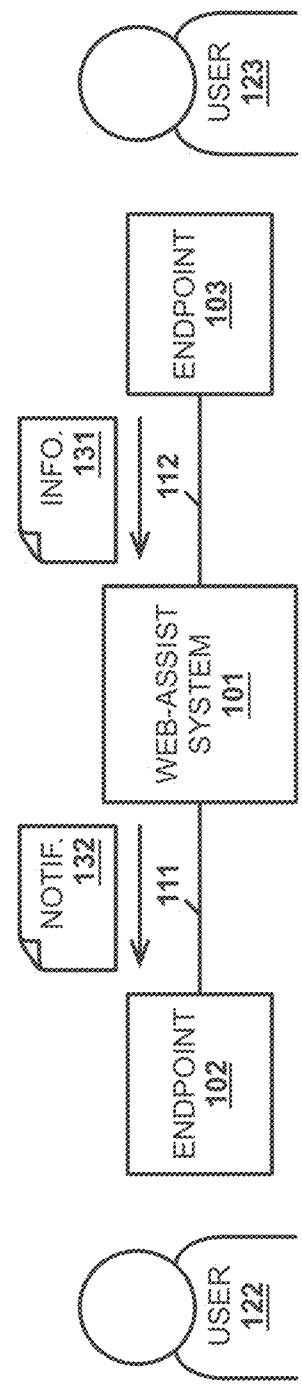
FIG. 1 illustrates an implementation for using gaze information to guide a user viewing a webpage during a communication session.

FIG. 1 illustrates implementation 100 for using gaze information to guide a user viewing a webpage during a communication session. Implementation 100 includes web-assist system 101, endpoint 102, and endpoint 103. User 122 operates endpoint 102 and user 123 operates endpoint 103. Endpoint 102 and web-assist system 101 communicate over communication link 111. Endpoint 103 and web-assist system 101 communicate over communication link 112. Communication links 111-112 are shown as direct links but may include intervening systems, networks, and/or devices.

In operation, endpoint 102 and endpoint 103 may each respectively be a telephone, tablet computer, laptop computer, desktop computer, conference room system, or some other type of user operable computing system. Web-assist system 101 is a computing system (e.g., server or collection of servers) that facilitates the capture of gaze information 131 regarding user 123 from endpoint 103 while user 123 is viewing a webpage presented by endpoint 103. In some examples, endpoint 102 may also be viewing the same webpage presented by endpoint 102. For instance, a co-browsing session may be established such that endpoint 102 and endpoint 103 synchronize the presentation of the webpage at endpoint 102 and endpoint 103 to user 122 and user 123, respectively. Web-assist system 101 may also facilitate the co-browsing session or a separate co-browsing system may be used instead. When gaze information 131 satisfies a criteria for notifying user 122, web-assist system 101 notifies user 122 by transferring notification 132 to endpoint 102, as described below.

Figure 2:
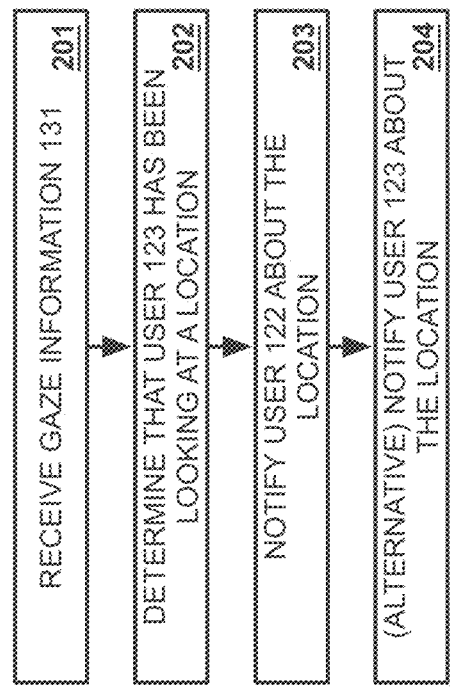
FIG. 2 illustrates an operation to use gaze information to guide a user viewing a webpage during a communication session.

FIG. 2 illustrates operation 200 to use gaze information to guide a user viewing a webpage during a communication session. In operation 200, user 122 and user 123 are communicating with each other over a communication session established between endpoint 102 and endpoint 103. The communication session may support voice, video, text chat, or some other type of real-time user communications. User 123 may have directed to endpoint 103 to establish the communication session, user 122 may have directed endpoint 102 to establish the communication session, or the communication session may have been initiated via some other system, such as a communication routing system or a communication control system that facilitates the communication session. Web-assist system 101 may facilitate the communication session itself, the communication session may be facilitated by some other system (e.g., the aforementioned communication control system), or may be facilitated on a peer-to-peer basis between endpoint 102 and endpoint 103.

In operation 200, web-assist system 101 receives gaze information 131 indicating a location where user 123 is looking relative to a webpage being presented to user 123 at endpoint 103 (201). The webpage may be presented by a web browser application executing on endpoint 103 or by some other application executing on endpoint 103 that is capable of displaying web pages to user 123 via a display of endpoint 103. Gaze information 131 is generated by endpoint 103 tracking the gaze of user 123 (i.e., where user 123's eyes are looking). Endpoint 103 may use a video camera built into, or otherwise, connected to endpoint 103 for capturing video user 123 that can be used for any purpose (e.g., for transmission on a video communication session, including the present communication session if the session is a video session). Alternatively, endpoint 103 may use dedicated eye tracking hardware to determine where user 123 is looking relative to the webpage. The location indicated by gaze information 131 may be a location on the webpage or may indicate that the user is not looking at the webpage (e.g., is looking at a different application window than the window, such as a browser window, that is displaying the webpage). The location may indicate a discrete area of the webpage. For example, the webpage may be divided into equal sized squares/rectangles (e.g., measured in pixels or may be dynamic based on a defined number of segments for width and height to account for different screen sizes/resolutions) and gaze information 131 may indicate into which of the squares/rectangles user 123 is looking. Alternatively, the webpage may be divided into areas based on what is presented by the webpage at that area (e.g., various display elements, such as text entry fields, links, buttons, product/service information section, written descriptions, photos, graphics, and/or other type of page element) and may, therefore, be shaped according to the size and shape of each individual area. For instance, the location may be a particular product listing displayed in the webpage among other product listings. In some examples, if user 123 scrolls the webpage, then the potential areas of the webpage that may be indicated by the location may also change. In other examples, the webpage may not be segmented, as in the above examples, but may be any point on the webpage. In those examples, since the webpage may be displayed differently depending on screen size, screen resolution, zoom level, etc., the location may be indicated, there may be a predefined convention used by both endpoint 103 and web-assist system 101 to ensure that gaze information 131 properly indicates the location to web-assist system 101.

After receiving gaze information 131, web-assist system 101 determines that user 123 has been looking at the location for longer than a threshold amount of time (202). The threshold amount of time may be any value (e.g., minutes and/or seconds). Preferably the threshold amount of time is set to a value corresponding to a likelihood that user 123 would benefit from user 122 being notified that user 123 has been looking at the same location for longer than the threshold. For example, user 123 looking at a particular location for longer than 10 seconds (i.e., the threshold amount of time) may indicate that user 123 is confused about what they are seeing at the location. In some examples, gaze information 131 may indicate a length of time in which user 123 has been looking at the location so that web-assist system 101 can simply compare that length to the threshold. Alternatively, web-assist system 101 may track duration itself as gaze information 131 is updated from user 123. For example, endpoint 103 may continually or periodically (e.g., every 2 seconds) update the location where user 123 is looking and transfer updated gaze information 131 accordingly. Web-assist system 101 may then track the locations reported in the updates to determine how long user 123 has been looking at a location. In some examples, if the location provided in gaze information 131 is specific (e.g., a point on the webpage), then web-assist system 101 may consider the location to be within a predefined distance of each other (e.g., within a radius from a best fit center point of a cluster of location points reported by endpoint 103) to account for eye movement around the location. Similarly, in some examples, web-assist system 101 may allow user 123's gaze to leave the location for a period of time (e.g., a period of time defined by another threshold) while not disrupting the duration used by web-assist system 101 to determine whether the threshold amount of time has been reached. For instance, user 123 may quickly look at something else on the screen, or outside of endpoint 103, before returning to looking at the location.

In response to determining that user 123 has been looking at the location for longer than the threshold amount of time, web-assist system 101 notifies user 122 about the second location (203). In this example, web-assist system 101 notifies user 122 by transferring notification 132 to endpoint 102. Upon receiving notification 132, endpoint 102 presents an alert to user 122 informing user 122 about the location. Notification 132 may explicitly instruct endpoint 102 to present the alert or endpoint 102 may be preconfigured to present an alert in response to receiving a notification like notification 132 (e.g., a software client executing on endpoint 102 may be configured to handle notifications received from web-assist system 101). The alert may be presented visually, audibly, or in some other manner by endpoint 102. In some examples, the alert may be displayed over a presentation of the webpage at endpoint 102. For instance, the webpage may be displayed at endpoint 102 and endpoint 103 during a co-browsing session that synchronizes the browsing of the webpage between endpoint 102 and endpoint 103. User 122 in those examples is, therefore, able to see exactly what portion of the webpage is being displayed at endpoint 103 and see the alert indicating the location where user 123 was looking.

In some cases, the alert may simply provide the location to user 122 (e.g., and rely on user 122 to understand why the location is being presented to them) while, in other cases, the alert may provide additional information about the location, as may be received in notification 132. For example, the alert may provide a suggestion about how user 122 should handle the fact that user 123 has been looking at the location for longer than the threshold amount of time (e.g., suggest to user 122 that user 122 ask, over the communication session, whether user 123 is confused by what user 123 is seeing at the location or may even provide an indication about what user 123 is likely confused about based on prior interactions with other users).

In some examples, web-assist system 101 may also (or instead) notify user 123 about the location (204). Web-assist system 101 may send a notification similar to notification 132 and endpoint 103 may alert user 123 in a manner similar to the alert presented by endpoint 102 above. Also like the alert above, the alert notifying user 123 about the location may provide additional information to user 123. For example, the alert may provide a suggestion intended to help user 123 navigate the webpage or the offerings on the webpage. Like the suggestion above, the suggestion to user 123 may be based on prior interactions with other users (e.g., suggest that user 123 take an action that other users that looked at the location for longer than the threshold amount of time also took). In some examples, web-assist system 101 may be able to notify user 123, and endpoint 103 may responsively present a suggestion in an alert, even when a communication session has not been established. Ideally, the suggestion would help to clarify any issues or questions that user 123 may have before user 123 feels the need to establish the communication session.

The alerts presented in response to notifications sent to either endpoint 102 or endpoint 103 in the above examples may also be based on the present context of the communication session at the time web-assist system 101 determines that user 123 has been looking at the location for longer than the threshold amount of time. The context may include a topic being discussed, the respective moods of user 122 and user 123, the sentiment of user 123 towards offers on the webpage or entity associated therewith, or some other type of information that can be gleaned from the user communications exchanged on the communication session. The context of the communication session may indicate a reason for user 123's gaze being on the location for longer than the threshold amount of time. Web-assist system 101 may then suggest through notifications, and subsequent alerts, to user 122 and/or user 123 an action that may be taken based on the determined reason. For instance, if the present context of the communication session is unrelated to what the webpage displays at the location, then web-assist system 101 may suggest an action to address that deviation. In a more specific example, if the context is that user 122 and user 123 are discussing Product A but user 123 is looking at Product B (i.e., the location) on the webpage, the notification to user 122 may suggest that user 122 should direct user 123 to Product A on the webpage or ask user 123 whether they want to discuss Product B instead. Similarly, a notification to user 123 may suggest that user 123 look where Product A is displayed or mention to user 122 that they would like to discuss Product B instead. In some examples, the present context of the communication may prevent notification(s) from occurring when user 123 is looking at a location for longer than the threshold amount of time. For instance, if the present context being discussed by user 122 and user 123 relates to the location (e.g., user 123 is looking at Product A while discussing Product A), then there may be no need to inform either user 122 or user 123 about the location.

Figure 3:
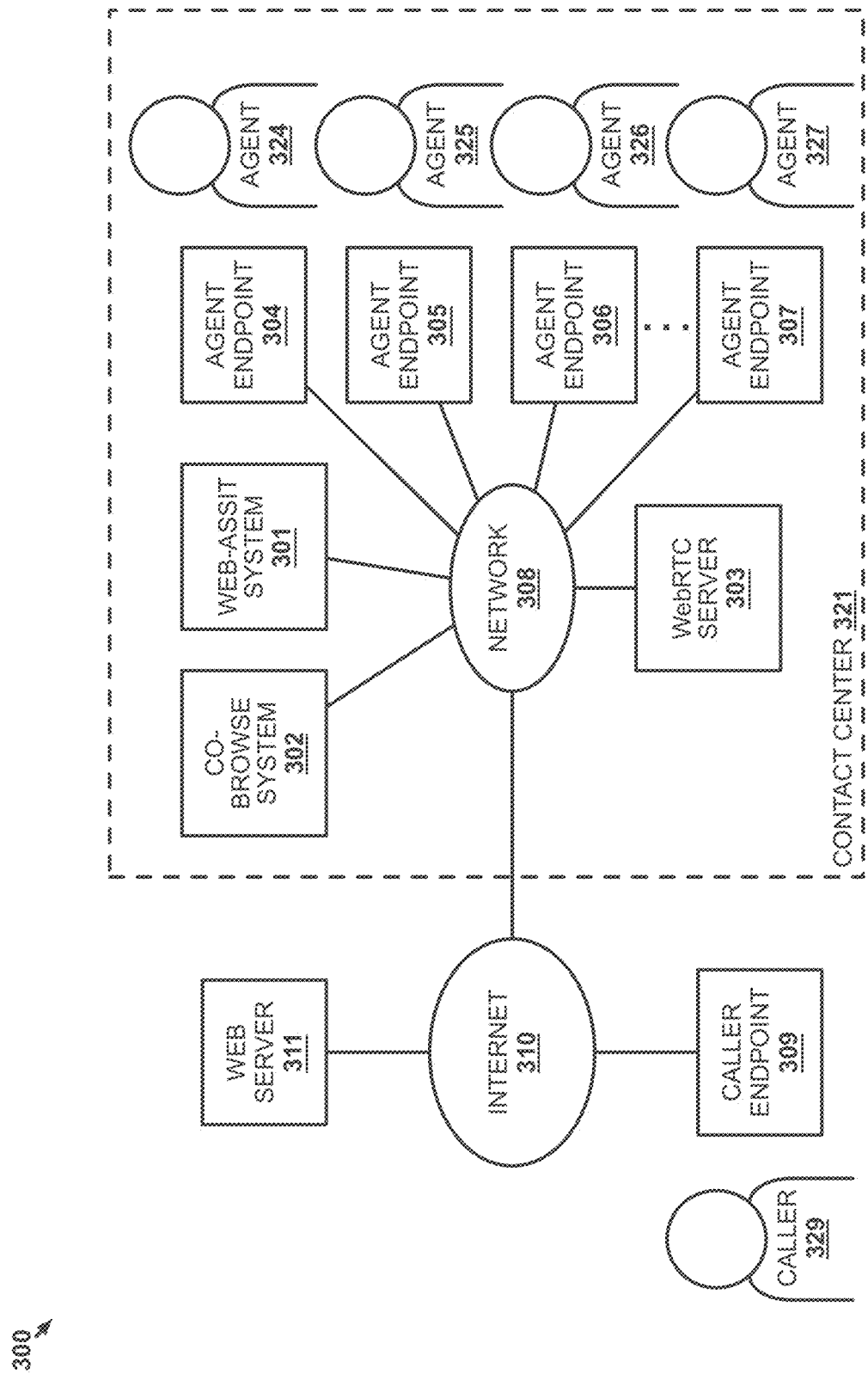
FIG. 3 illustrates an implementation for using gaze information to guide a user viewing a webpage during a communication session.

FIG. 3 illustrates implementation 300 for using gaze information to guide a user viewing a webpage during a communication session. Implementation 300 includes co-browsing system 302, co-browsing system 302, WebRTC server 303, agent endpoints 304-307, contact center network 308, caller endpoint 309, Internet 310, and web server 311. Although, web-assist system 301, co-browsing system 302, WebRTC server 303, agent endpoints 304-307, contact center network 308 are part of contact center 321, no element of contact center 321 need be co-located with another. As such, contact center network 308 may use Internet 310, and possibly other local area networks, to exchange communications. While only four agent endpoints are shown in implementation 300, contact center 321 may include any number of agent endpoints.

In this example, agent endpoints 304-307 are operated by respective agents 324-327 and caller endpoint 309 is operated by caller 329. WebRTC is used to exchange user communications between endpoints and WebRTC server 303 handles the exchange of those communications, although, in other examples, other forms of communication may be used instead. In the examples below, caller endpoint 309 is also using WebRTC, via a WebRTC client executing thereon, and will have a similar connection to WebRTC server 303 established. However, in other examples, caller endpoint 309 may connect to contact center 321 in some other manner (e.g., a traditional telephone call) and WebRTC server 303, or some other system of contact center 321, will act as a gateway to the WebRTC connection with an agent endpoint. Co-browsing system 302 facilitates the co-browsing of webpages between an agent endpoint and a caller endpoint. In this case, the webpage being co-browsed is provided by web server 311. While shown as distinct devices in contact center 321, in other examples one or more of web-assist system 301, co-browsing system 302, and WebRTC server 303 may be combined into fewer distinct systems.

Figure 4:
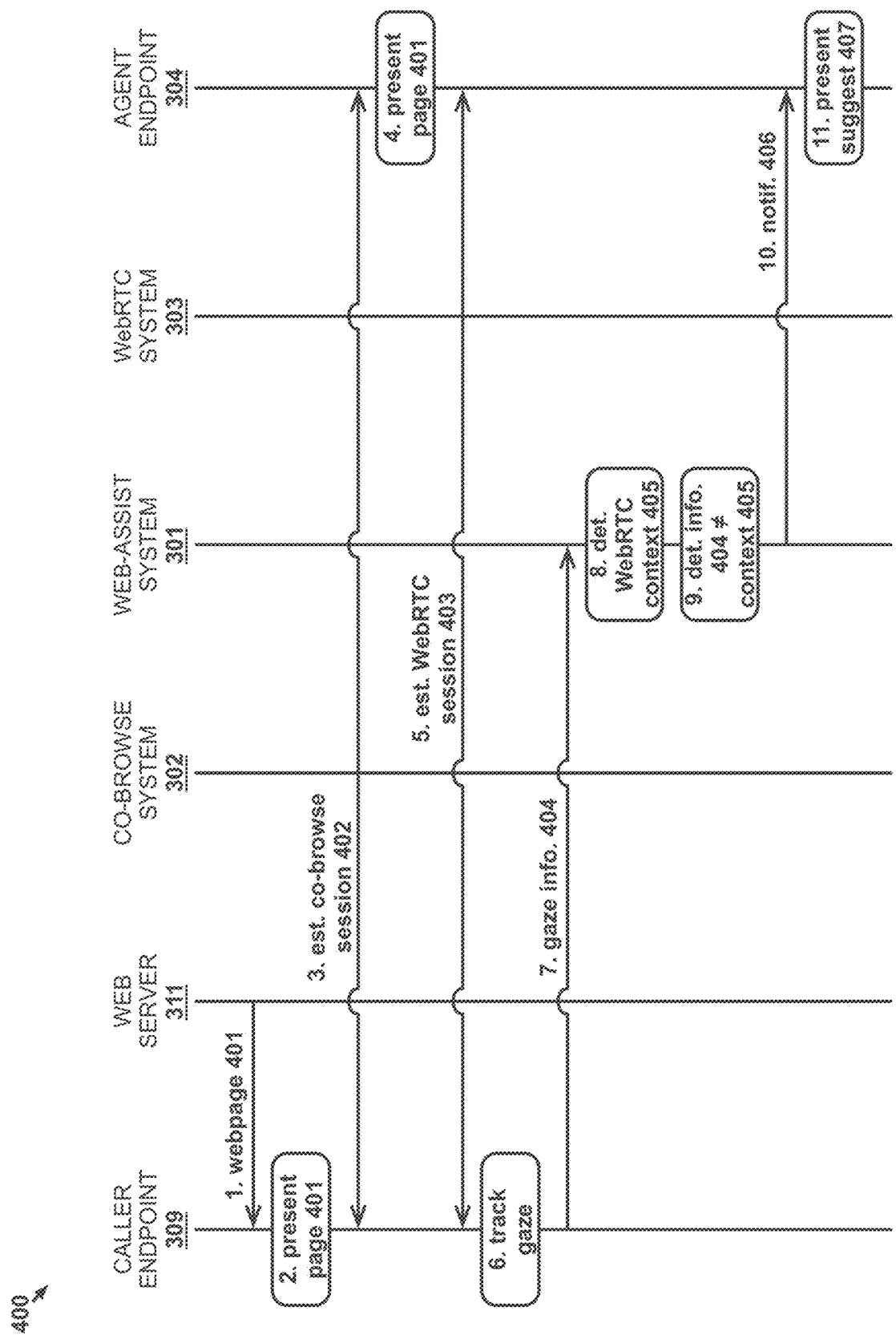
FIG. 4 illustrates an operational scenario for using gaze information to guide a user viewing a webpage during a communication session.

FIG. 4 illustrates operational scenario 400 for using gaze information to guide a user viewing a webpage during a communication session. In operational scenario 400, caller endpoint 309 receives webpage 401 at step 1 from web server 311. Webpage 401 is transferred in a format (e.g., a Hypertext Markup Language based code) that a web browser application executing on caller endpoint 309 is configured to render for presentation on a display of webpage 401. In some examples, caller endpoint 309 may retrieve additional presentation elements for webpage 401 from a different system than web server 311. For instance, the code for webpage 401 received from web server 311 may direct the web browser to request photos, other graphics, and/or ads from a different server. Caller 329 may have navigated the web browser to webpage 401 or the retrieval of webpage 401 may be initiated in some other manner. Caller endpoint 309 then presents webpage 401 at step 2 to caller 329. For example, the web browser mentioned above may direct caller endpoint 309 to render webpage 401 and display webpage 401 in a Graphical User Interface (GUI) window of the web browser. Caller 329 may then browse and interact with webpage 401 via user interface components of caller endpoint 309 (e.g., mouse, touchscreen, and/or keyboard).

In this example, webpage 401 includes a button or link that, when selected by caller 329, initiates a co-browsing session with one of agents 324-327 from contact center 321. In response to the user selection, co-browsing system 302 is directed to establish co-browsing session 402 at step 3 between caller endpoint 309 and agent endpoint 304. Agent endpoint 304 may be selected from agent endpoints 304-307 by co-browsing system 302 itself or another system of contact center 321 may perform the selection and direct co-browsing system 302 to use agent endpoint 304 accordingly. After establishing WebRTC session 403, agent endpoint 304 also presents webpage 401. In some examples, co-browsing system 302 may cause the same instance of webpage 401 to be presented at both caller endpoint 309 and agent endpoint 304, although co-browsing system 302 may implement co-browsing of webpage 401 in some other manner.

Since co-browsing alone may not be very affective without communicating with agent 324, WebRTC session 403 is also established at step S by WebRTC server 303. WebRTC session 403 allows caller 329 and agent 324 to at least speak with one another in real-time while also participating in co-browsing session 402. In some examples, WebRTC session 403 may carry video captured of caller 329 and/or agent 324 to accompany the audio captured thereof. A web-based client executing in a browser on caller endpoint 309 and agent endpoint 304 may handle both co-browsing session 402 and WebRTC session 403 at the endpoints or each session may be handled by different clients. In some examples, rather than being web-based, the client may be a browser plugin or an application executing separately from the browser. While WebRTC session 403 is established after co-browsing session 402 in this example, WebRTC session 403 may be established before co-browsing session 402 in other examples. For instance, caller 329 may first speak to agent 324 over WebRTC session 403 and then, during the course of that conversation, agent 324 or caller 329 may decide that co-browsing session 402 would be helpful and should be established.

While caller 329 and agent 324 are co-browsing over co-browsing session 402 and talking over WebRTC session context 405, caller endpoint 309 tracks the gaze of caller 329 at step 6 relative to the display of webpage 401. Tracking the gaze of caller 329 enables the creation of gaze information 404 by caller endpoint 309. Caller endpoint 309 sends gaze information 404 to web-assist system 301 at step 7. The information in gaze information 404 notifies web-assist system 301 about where caller 329 is looking relative to webpage 401. That is, gaze information 404 may indicate that caller 329 is looking at a particular area on webpage 401 or may indicate that caller 329 is not looking at webpage 401 at all. As caller endpoint 309 continues to track the gaze of caller 329, caller endpoint 309 may continue to generate updated gaze information 404 and send the updated gaze information 404 to web-assist system 301 so that web-assist system 301 can determine whether caller 329 is looking at a location on webpage 401 for longer than a threshold amount of time. Similarly, when web-assist system 301 is informed by gaze information 404 that caller 329 has not been looking at webpage 401 for longer than the threshold amount of time, then the fact that caller 329 is not looking at webpage 401 may also be considered a location relative to webpage 401. In some examples, caller endpoint 309 itself determine that caller 329 has been looking at a location for longer than the threshold amount of time. In those cases, gaze information 404 may be transferred upon making that determination to inform web-assist system 301 about the location.

Web-assist system 301 determines WebRTC session context 405 at step S, which is the present context of the user communications being exchanged between caller 329 and agent 324 over WebRTC session 403 when web-assist system 301 determines that caller 329 has been looking at the location for longer than the threshold amount of time. Though not shown, web-assist system 301 may have access to the user communications on WebRTC session 403 to determine WebRTC session context 405 or web-assist system 301 may determine WebRTC session context 405 by receiving WebRTC session context 405 from another system, such as WebRTC server 303. WebRTC session context 405 may be determined by applying a natural language processing algorithm, or some other type of algorithm, to the user communications exchanged over WebRTC session 403 to determine a topic of conversation, a mood of caller 329 and/or agent 324, a sentiment of caller 329, or any other type of information that can be gleaned from user communications.

In this example, web-assist system 301 determines, at step 9, that the location looked at by the user for longer than the threshold amount of time, as indicated by gaze information 404, is unrelated to WebRTC session context 405. For instance, caller 329 and agent 324 may be discussing a different topic than that shown at the location on webpage 401 or agent 324 may have directed caller 329 to look at a particular location on webpage 401 and the location indicated by gaze information 404 is not that particular location. The above determination triggers web-assist system 301 to send notification 406 at step 10 to agent endpoint 304. In this example, notification 406 is a message that includes a suggestion 407 that should be presented by agent endpoint 304 to agent 324. Suggestion 407 may include an action the web-assist system 301 is suggesting that agent 324 take in order to address the fact that WebRTC session context 405 does not match the location. For instance, suggestion 407 may suggest that agent 324 change context of WebRTC session 403 or direct caller 329 to a location on the webpage that relates to the present context. Suggestion 407 may be determined based on gaze information and contexts from previous communication sessions between agents of contact center 321 and callers with respect to webpage 401 (or other webpages in some cases). For example, web-assist system 301 may learn from previous communication sessions that caller 329 may think they are looking at the right location, but really are not, due to confusion about the directions provided by agent 324. Regardless, upon receiving notification 406, agent endpoint 304 alerts agent 324 about the location relative to webpage 401 and presents suggestion 407 at step 11. Suggestion 407 may be audibly or visually presented to agent 324. In some examples, suggestion 407 may be displayed nearby the location on webpage 401 so as agent 324 can more readily associate the suggestion with where caller 329 is looking.

Although agent 324 is provided with a suggestion in the above scenario, web-assist system 301 may send a notification message to caller endpoint 309 so that caller 329 may be presented with a suggestion in other examples. The suggestion presented to caller 329 may be the same as or different from suggestion 407. In some cases, when both agent 324 and caller 329 are presented with suggestions, the suggestions may complement each other. For example, a suggestion to caller 329 may direct caller 329 to look at a different location on webpage 401 while a suggestion to agent 324 may direct agent 324 to guide caller 329 to the different location.

Figure 5:
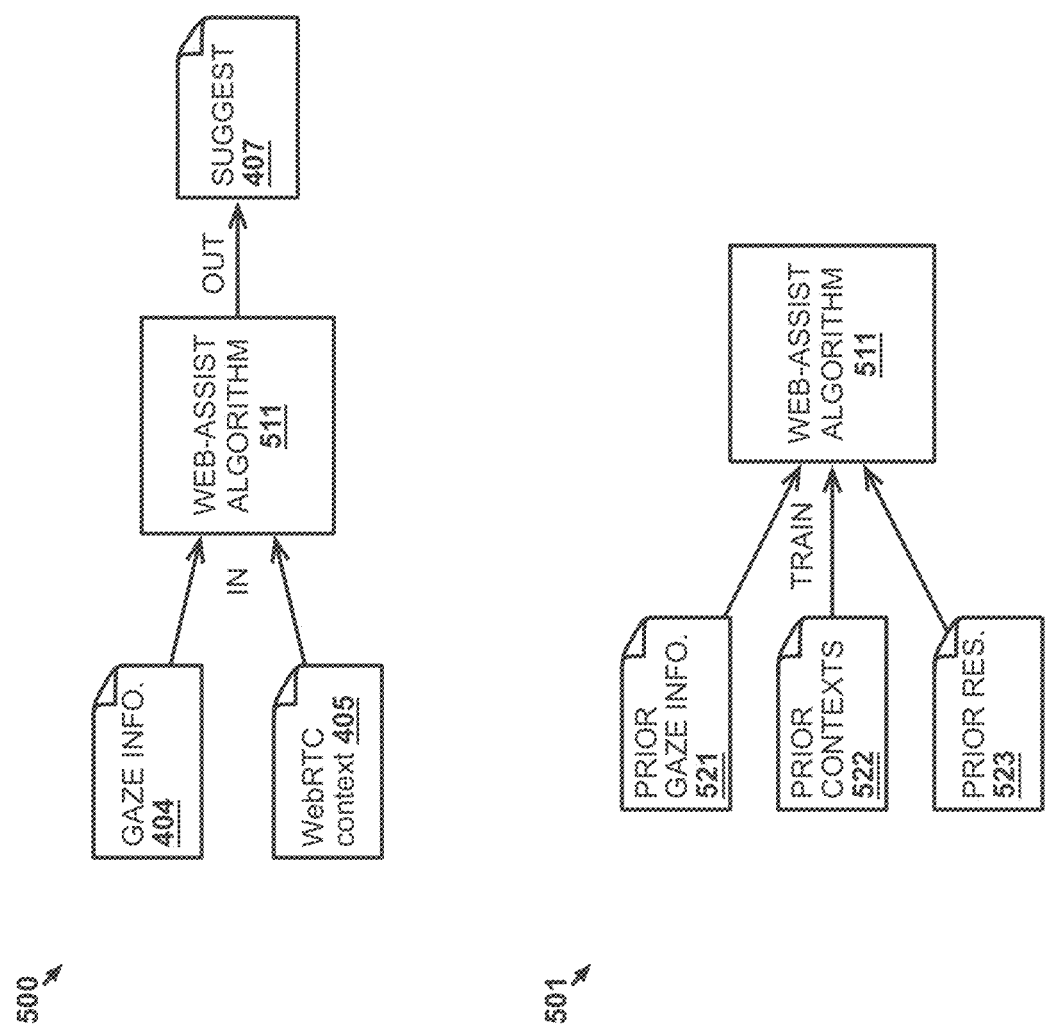
FIG. 5 illustrates operational scenarios for using gaze information to guide a user viewing a webpage during a communication session.

FIG. 5 illustrates operational scenario 500 and operational scenario 501 for using gaze information to guide a user viewing a webpage during a communication session. Operational scenario 500 is an example for how web-assist system 301 may use web-assist algorithm 511 to determine suggestion 407 in operational scenario 400. In particular, web-assist algorithm 511 is an algorithm that may be trained using machine learning, as described in operational scenario 501 below. Once trained, web-assist system 301 inputs gaze information 404, or at least the location determined to be looked at for longer than the threshold amount of time, and WebRTC session context 405 into web-assist algorithm 511 and web-assist algorithm 511 outputs suggestion 407. In some examples, web-assist algorithm 511 may also handle the determination of whether caller 329 has been looking at the location for longer than the threshold amount of time. In fact, based on what web-assist algorithm 511 learns from the training, web-assist algorithm 511 may employ different thresholds depending on the particular circumstances. For instance, web-assist algorithm 511 may learn that it can determine that a user is confused by one location of webpage 401 based on a shorter threshold than when the user is looking at another location. Similarly, the present context of the communication session may indicate that the threshold can be shorter. For example, if agent 324 is instructing caller 329 to input user into a particular field, then caller 329 looking at any other field, even if for a very short amount of time, may indicate to web-assist algorithm 511 the location caller 329 is looking at needs to be addressed by agent 324.

Operational scenario 501 is an example of how web-assist algorithm 511 may be trained to perform in operational scenario 500. Web-assist system 301 may handle the training of web-assist algorithm 511 itself or another system may handle the training. In some examples, web-assist algorithm 511 may continue to be trained even as it is being used by web-assist system 301 to enhance the ability of web-assist algorithm 511 to provide suggestions. In this example, web-assist algorithm 511 is trained by providing prior gaze information 521, prior contexts 522 that correspond to respective portions of prior gaze information 521, and prior resolutions 523 that also correspond to respective portions of prior gaze information 521 and prior resolutions 523. Prior resolutions 523 may only indicate resolutions (e.g., actions taken in response to the corresponding portions of prior gaze information 521 and prior contexts 522) that achieved positive results so that web-assist algorithm 511 can learn resolutions that worked (e.g., helped the caller) in various scenarios. A resolution that had positive results may then be output by web-assist algorithm 511 in response to being fed gaze information and session context similar to gaze information and session contexts associated with the resolution previously. Prior resolutions 523 may also indicate resolutions that achieved negative results so that web-assist algorithm 511 can learn to avoid suggesting resolutions that have negative results (e.g., were not helpful to the caller). The more prior gaze information 521, prior contexts 522, and prior resolutions 523 are fed into web-assist algorithm 511 the more scenarios web-assist algorithm 511 will be able to provide an appropriate suggestion for.

While the examples above describe how web-assist algorithm 511 may be used to determine suggestion 407 in real-time, other examples may employ web-assist algorithm 511 for other types of scenarios, such as agent training, website support (e.g., FAQs), website design, and other non-real-time applications. For example, web-assist algorithm 511 may be used to indicate common issues that arise when a user is browsing webpage 401 based on what web-assist algorithm 511 learned in operational scenario 501. Agents 324-327 may then be preemptively trained to handle the issues, FAQs associated with webpage 401 may be updated to provide assistance to users without the users having to call contact center 321, webpage 401 may be redesigned to obviate the issues, or some other mitigating action may be take—including combinations thereof.

Figure 6:
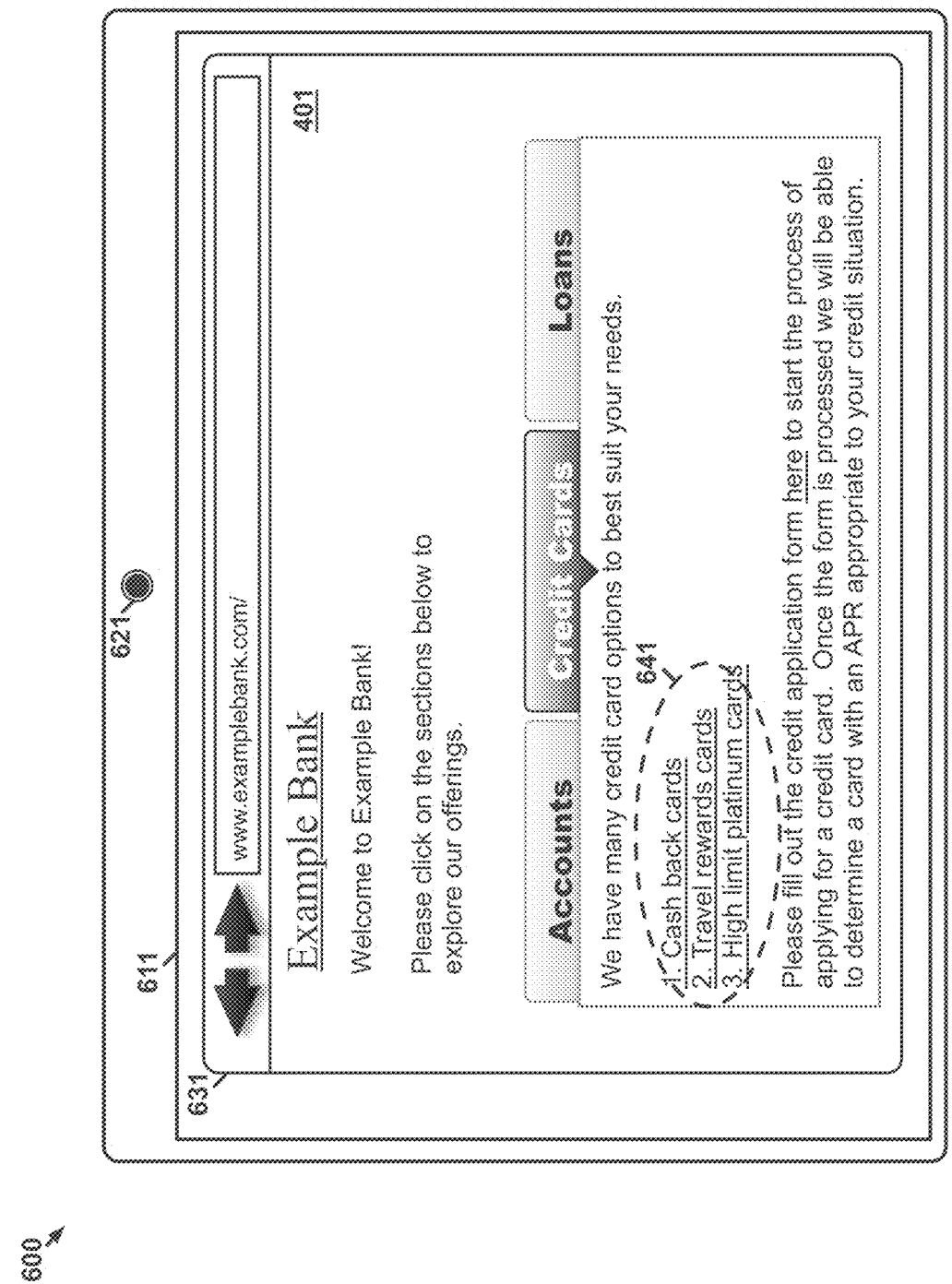
FIG. 6 illustrates a display system for using gaze information to guide a user viewing a webpage during a communication session.

FIG. 6 illustrates display system 600 for using gaze information to guide a user viewing a webpage during a communication session. Display system 600 includes display 611 and camera 621. Display 611 may be a cathode ray tube (CRT), Liquid Crystal Display (LCD), Light Emitting Diode display (LED), or some other type of display capable of presenting images described below. Camera 621 includes optics and an image sensor for capturing video of a participant viewing display 611. Display system 600, in this example, is a display system of caller endpoint 309.

Display 611 presents web-browser window 631, which is a window for a web-browser application executing on caller endpoint 309. Web-browser window 631 presenting webpage 401, which is a webpage for "Example Bank" in this scenario. Location 641 on webpage 401 is an example of a location where web-assist system 301 has determined caller 329 has been looking for longer than the threshold amount of time. As can be seen, location 641 is not just a point on webpage 401 but rather is a general region around three menu options for credit cards. Accordingly, caller 329 is still considered to be looking at the same location 641 for longer than the threshold amount of time even as caller 329 reads through the three options. In this example, the oval identifying location 641 is not actually displayed, although, in other examples, an indication of location 641 may be displayed to caller 329 to make them aware that they have been looking at location 641 for an inordinately long time (i.e., longer than the threshold amount of time). With respect to operational scenario 400, agent endpoint 304 would receive a notification from web-assist system 301 and, responsively, present an indication of location 641 while co-browsing webpage 401, which may actually look similar to the oval in FIG. 6, although other manners of indicating a location may be used.

Figure 7:
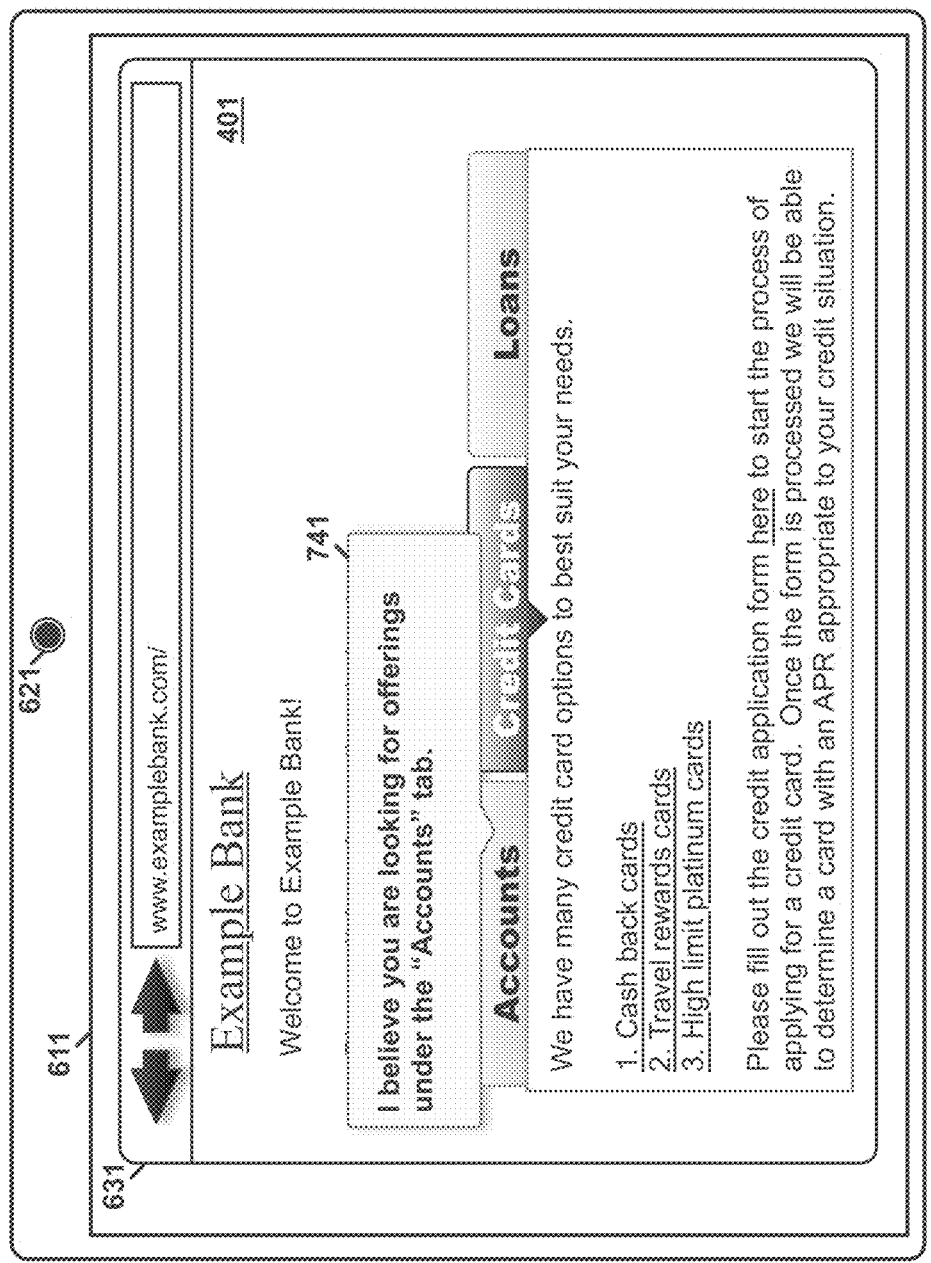
FIG. 7 illustrates a display system for using gaze information to guide a user viewing a webpage during a communication session.

FIG. 7 illustrates display system 700 for using gaze information to guide a user viewing a webpage during a communication session. Display system 700 is an example of display system 600 after caller 329 receives a notification from web-assist system 301 in response to web-assist system 301 determining that caller 329 has been looking at location 641 longer than the threshold amount of time. In this example, web-assist system 301 determined, using gaze information 404 identifying location 641 and WebRTC session context 405, that caller 329 should be looking at information in the "Accounts" tab of webpage 401 rather than the "Credit Cards" tab. For instance, agent 324 may be discussing opening an account with the bank and caller 329 may be confused because they are looking at credit card options and, therefore, not seeing the accounts to which agent 324 is referring. Web-assist system 301 determines, using web-assist algorithm 511 or otherwise, that a suggestion to look at the accounts tab should be presented to caller 329. In response to receiving the notification from web-assist system 301, caller endpoint 309 displays alert 741 which includes a suggestion guiding caller 329 towards the accounts tab.

In the context of operational scenario 400, suggestion 407 may be a complementary suggestion to that displayed in alert 741. For example, suggestion 407 may suggest to agent 324 that they direct caller 329 to look at the accounts tab because they are currently looking at credit cards. Suggestion 407 may be presented to agent 324 in a manner similar to alert 741's presentation to caller 329 or a different form of alert may be presented instead.

Figure 8:
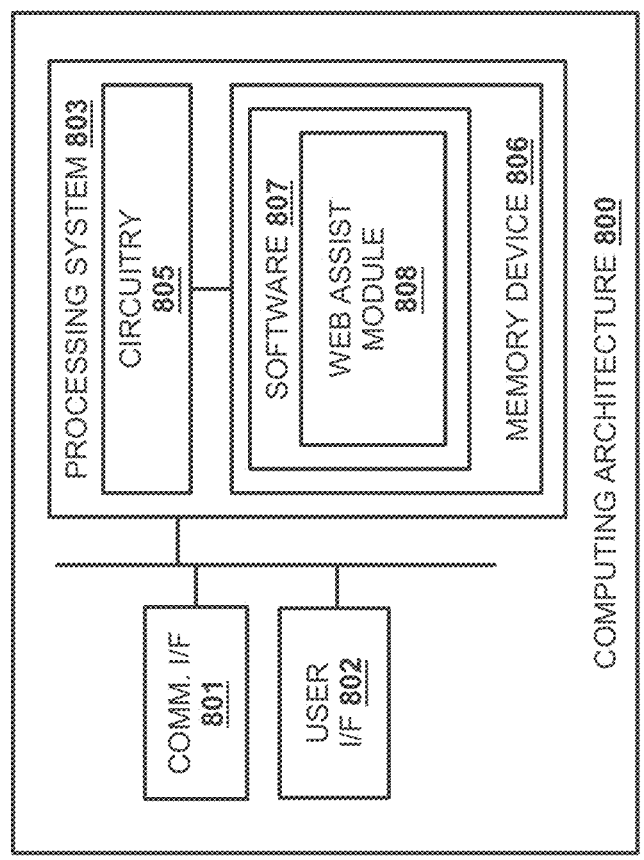
FIG. 8 illustrates a computing architecture for using gaze information to guide a user viewing a webpage during a communication session.

FIG. 8 illustrates computing architecture 800 for using gaze information to guide a user viewing a webpage during a communication session. Computing architecture 800 is an example computing architecture for web-assist systems 101 and 301, although systems 101 and 301 may use alternative configurations. Computing architecture 800 may also be used for other computing systems described herein. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes web-assist module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, during a communication session between a first endpoint operated by a first user and a second endpoint operated by a second user, web-assist module 808 directs processing system 803 to receive gaze information indicating a location where the second user is looking relative to a webpage being presented to the second user at the second endpoint. Web-assist module 808 further directs processing system 803 to determine that the second user has been looking at the location for longer than a threshold amount of time. In response to determining that the second user has been looking at the location for longer than the threshold amount of time, web-assist module 808 directed processing system 803 to notify the first user about the second location.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
during a communication session between a first endpoint operated by a first user and a second endpoint operated by a second user:
receiving gaze information indicating a location where the second user is looking relative to a webpage being presented to the second user at the second endpoint;
determining that the second user has been looking at the location for longer than a threshold amount of time; and
in response to determining that the second user has been looking at the location for longer than the threshold amount of time, notifying the first user about the location, wherein notifying the first user includes a suggestion of a resolution used with a caller during a previous communication session having previous gaze information indicating a previous user looked at the location for longer than the threshold amount of time.

2. The method of claim 1, comprising:
presenting the webpage to the first user at the first endpoint, wherein the communication session comprises a co-browsing session through which the webpage is presented at the first endpoint and the second endpoint.

3. The method of claim 2, wherein notifying the first user comprises:
presenting, on the webpage at the first endpoint with the suggestion, an indication of the location and an alert informing the first user that the second user has been looking at the location for longer than the threshold amount of time.

4. The method of claim 1, wherein notifying the first user comprises:
presenting, with the suggestion, an alert informing the first user that the second user has been looking at the location for longer than the threshold amount of time.

5. The method of claim 1, wherein the suggestion directs the first user to guide the second user to a second location on the webpage that is related to a present context of the communication session.

6. The method of claim 1, wherein the suggestion directs the first user to address a location context associated with the location.

7. The method of claim 1, wherein determining that the second user has been looking at the location for longer than the threshold amount of time comprises:
feeding the gaze information and a present context of user communications over the communication session into an artificial intelligence algorithm, wherein the artificial intelligence algorithm outputs instructions for notifying the first user about the second location.

8. The method of claim 7, further comprising:
training the artificial intelligence algorithm using prior gaze information, prior present contexts of user communications, and prior resolutions on previous communication sessions.

9. A method comprising:
receiving gaze information over a communication network from an endpoint indicating a location where a user of the endpoint is looking relative to a webpage being presented to the user at the endpoint;
determining that the user has been looking at the location for longer than a threshold amount of time; and
in response to determining that the user has been looking at the location for longer than the threshold amount of time, notifying the user about the location, wherein notifying the user includes an alert indicating an action taken by a previous user of the webpage who also looked at the location for longer than the threshold amount of time.

10. The method of claim 9, wherein the receiving, the determining, and the notifying occur during a communication session between the endpoint and a second endpoint.

11. The method of claim 9, wherein the alert helps the user navigate offerings on the webpage.

12. The method of claim 9, wherein the alert clarifies one or more issues of the user prior to establishing a communication session between the endpoint and a second endpoint.

13. The method of claim 9, wherein determining that the user has been looking at the location for longer than the threshold amount of time comprises:
feeding the gaze information into an artificial intelligence algorithm, wherein the artificial intelligence algorithm outputs the alert.

14. An apparatus comprising:
one or more computer readable storage media;
a processing system operatively coupled with the one or more computer readable storage media; and
program instructions stored on the one or more computer readable storage media that, when read and executed by the processing system, direct the apparatus to:
during a communication session between a first endpoint operated by a first user and a second endpoint operated by a second user:
receive gaze information indicating a location where the second user is looking relative to a webpage being presented to the second user at the second endpoint;
determine that the second user has been looking at the location for longer than a threshold amount of time; and
in response to determining that the second user has been looking at the location for longer than the threshold amount of time, notify the first user about the location, wherein notification of the first user includes a suggestion of a resolution used with a caller during a previous communication session having previous gaze information indicating a previous user looked at the location for longer than the threshold amount of time.

15. The apparatus of claim 14, wherein the program instructions direct the processing system to:
present the webpage to the first user at the first endpoint, wherein the communication session comprises a co-browsing session through which the webpage is presented at the first endpoint and the second endpoint.

16. The apparatus of claim 15, wherein to notify the first user, the program instructions direct the apparatus to:
- present, on the webpage at the first endpoint with the suggestion, an indication of the location and an alert informing the first user that the second user has been looking at the location for longer than the threshold amount of time.

17. The apparatus of claim 14, wherein to notify the first user, the program instructions direct the apparatus to:
- present, with the suggestion, an alert informing the first user that the second user has been looking at the location for longer than the threshold amount of time.

18. The apparatus of claim 14, wherein the suggestion directs the first user to guide the second user to a second location on the webpage that is related to a present context of the communication session.

19. The apparatus of claim 14, wherein the suggestion directs the first user to address a location context associated with the location.

20. The apparatus of claim 14, wherein to determine that the second user has been looking at the location for longer than the threshold amount of time, the program instructions direct the apparatus to:
- feed the gaze information and a present context of user communications over the communication session into an artificial intelligence algorithm, wherein the artificial intelligence algorithm outputs instructions for notifying the first user about the second location.

* * * * *